US012767058B2

(12) United States Patent
Nieminen et al.

(10) Patent No.: US 12,767,058 B2
(45) Date of Patent: Oct. 20, 2026

(54) DRIVE BELT STORAGE SYSTEM

(71) Applicant: Bombardier Recreational Products Inc., Valcourt (CA)

(72) Inventors: Antto Nieminen, Rovaniemi (FI); Jonathan Asselin, Magog (CA); Cedrick Lebeau, Ulverton (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 136 days.

(21) Appl. No.: 18/822,051

(22) Filed: Aug. 30, 2024

(65) Prior Publication Data

US 2026/0061939 A1 Mar. 5, 2026

(51) Int. Cl.
*B60R 7/04* (2006.01)
*B60R 11/06* (2006.01)

(52) U.S. Cl.
CPC .............. *B60R 7/043* (2013.01); *B60R 11/06* (2013.01); *B60Y 2200/252* (2013.01)

(58) Field of Classification Search
CPC .... B60R 7/043; B60R 11/06; B60Y 2200/252
See application file for complete search history.

(56) References Cited

U.S. PATENT DOCUMENTS

| | | | | |
|---|---|---|---|---|
| 7,708,097 B1 * | 5/2010 | Tharaldson | B62M 27/02 180/190 |
| 8,012,050 B2 * | 9/2011 | Aitcin | B60K 17/06 180/9.1 |
| 2023/0257065 A1 * | 8/2023 | Langaas | B62J 17/02 180/190 |

FOREIGN PATENT DOCUMENTS

CN 101229817 A * 7/2008 ............ B62M 27/02

* cited by examiner

*Primary Examiner* — Faye M Fleming
(74) *Attorney, Agent, or Firm* — BCF LLP

(57) ABSTRACT

A drive belt storage device may comprise a sub-base, wherein the sub-base comprises a containment section facing upwardly and a channel within the containment section that is recessed from a rest surface by a wall, the rest surface facing downwardly. A seat may be interconnected to the sub-base via a perimeter so that the channel is configured to frictionally hold the drive belt using at least the recessed wall when the drive belt is folded at least once.

20 Claims, 5 Drawing Sheets

DRIVE BELT STORAGE SYSTEM

FIELD OF THE INVENTION

The present invention relates to storage for drive belts for use in recreational vehicles that use the same, such as, for example, snowmobiles, side-by-side vehicles, and ATVs.

BACKGROUND

The drive belt is one of many types of spare parts that recreational vehicle users may carry with them for purposes of replacement following vehicle or part damage. Due to its rubber construction, the drive belt naturally tends to expand into a larger annular shape, which makes storage and retention of the drive belt challenging and detrimental to available space.

Until the present, users of recreational vehicles store the drive belt within the engine compartment of the vehicle. An example of different storage spaces may be understood with reference to Belt Holder Part No. 0636-659, which can be found in https://www.hardcoresledder.com/threads/spare-belt-storage.1524282/#post-16190666 (last visited Aug. 21, 2024). However, as space becomes less available in vehicles, particularly within the engine compartment and elsewhere (e.g. within their cowlings), there is a need to find an appropriate space for spare drive belts. Furthermore, placing a drive belt close to heat sources comes with an increased risk of damaging the material composition of the belt by vulcanizing and/or hardening the rubber and weakening the part.

Additionally, since drive belts tend to want to expand from any folded or compressed state, mere placement of a drive belt on known retention points of recreational vehicles is insufficient to prevent displacement of the drive belt during recreational vehicle operation, which tends to be rough and susceptible to shock forces at different angles. Moreover, placing a drive belt under or near other containers creates the prospect of the drive belt "springing" out of place or otherwise preventing smooth alignment and/or storage of containers within any space the recreational vehicle may already have.

There remains a need to cure the above drawbacks related to storage of recreational vehicle drive belts.

SUMMARY

An exemplary drive belt storage device may comprise a sub-base having a containment section facing upwardly and a channel within the containment section that is recessed from a rest surface of the sub-base by a recessed wall. According to this exemplary embodiment, the rest surface of the containment section may face downwardly during installation on a recreational vehicle. Further according to this exemplary embodiment, a seat may be interconnected to the sub-base via a perimeter such that when in the interconnected mode, the sub-base channel is configured to hold the drive belt using at least the recessed wall when the drive belt is folded.

In an alternative exemplary embodiment, a drive belt storage device may be comprised of a seat comprising foam and a cover for holding the foam, a sub-base interconnected to the cover of the seat, and a retention channel comprising at least one recessed wall in the sub-base and a hub around which a folded drive belt is configured to frictionally contact the at least one recessed wall.

In addition to the previously described embodiment and/or as an alternative to any other described exemplary embodiment, an exemplary drive belt storage system further comprises a hub around which the channel is formed.

In addition to the previously described embodiment and/or as an alternative to any other described exemplary embodiment, an exemplary drive belt storage system further comprises a hub separating portions of the channel from one another.

In addition to the previously described embodiment and/or as an alternative to any other described exemplary embodiment, an exemplary drive belt storage system further comprises at least one device coupled to the sub-base opposite the upper surface to further frictionally hold the at least once folded drive belt within the channel.

In addition to the previously described embodiment and/or as an alternative to any other described exemplary embodiment, an exemplary drive belt storage system further comprises a plurality of holes through the containment section and the channel.

In addition to the previously described embodiment and/or as an alternative to any other described exemplary embodiment, an exemplary drive belt storage system further comprises a plurality of holes in the retention channel.

In addition to the previously described embodiment and/or as an alternative to any other described exemplary embodiment, an exemplary drive belt storage system further comprises means for securing the folded drive belt disposed on the sub-base.

In addition to the previously described embodiment and/or as an alternative to any other described exemplary embodiment, an exemplary drive belt storage system further comprises latching mechanisms to interconnect the sub-base and seat to a recreational vehicle.

In addition to the previously described embodiment and/or as an alternative to any other described exemplary embodiment, an exemplary drive belt storage system further comprises a U-shaped channel and a divider.

In addition to the previously described embodiments and/or as an alternative to any other described exemplary embodiment, an exemplary drive belt storage system is configured such that the channel comprises a circular pathway.

In addition to the previously described embodiments and/or as an alternative to any other described exemplary embodiment, an exemplary drive belt storage system is configured such that the sub-base comprises mechanisms for releasably securing the sub-base to a portion of a recreational vehicle.

In addition to the previously described embodiments and/or as an alternative to any other described exemplary embodiment, an exemplary drive belt storage system is configured such that the recreational vehicle is a snowmobile gas tank.

In addition to the previously described embodiments and/or as an alternative to any other described exemplary embodiment, an exemplary drive belt storage system is configured such that the channel comprises a circular pathway.

In addition to the previously described embodiments and/or as an alternative to any other described exemplary embodiment, an exemplary drive belt storage system is configured such that a substantial amount of the seat foam is disposed on top of the sub-base.

A recreational vehicle may comprise the drive belt storage device of each of the previously described embodiments and/or as an alternative to any other described exemplary embodiments.

A recreational vehicle may comprise the drive belt storage device of each of the previously described embodiments and/or as an alternative to any other described exemplary embodiments and be configured such that a drive belt is held therein.

In addition to the previously described embodiments and/or as an alternative to any other described exemplary embodiment, a snowmobile may be the recreational vehicle type on which such embodiment is installed and the sub-base is disposed on the gas tank of such a snowmobile.

Figure 1:
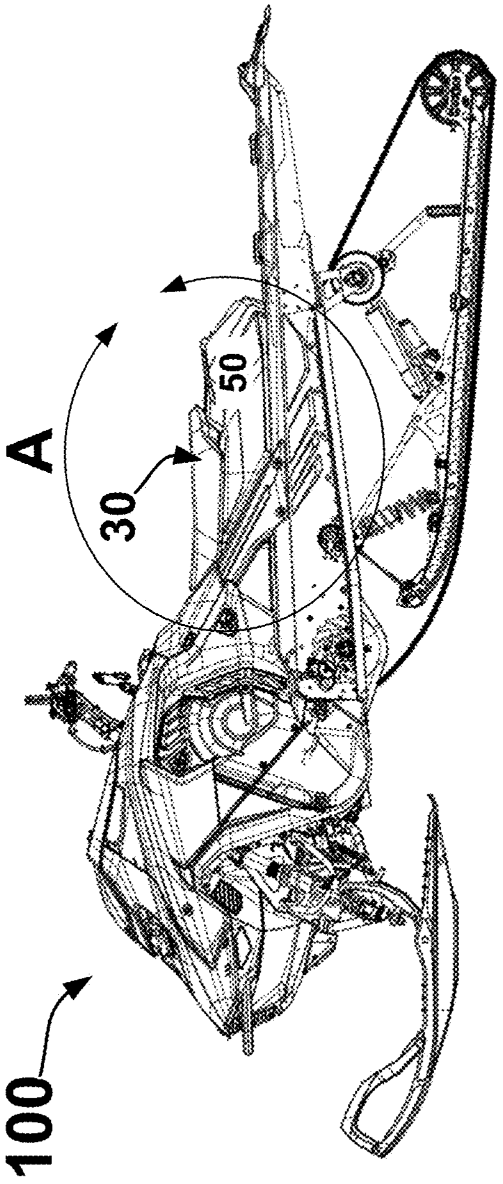
FIG. 1 illustrates an exemplary recreational vehicle in the form of a snowmobile on which is placed an exemplary inventive drive track storage system.

In the drawings like characters of reference indicate corresponding parts in the different and interchangeable and interrelated figures. Parts and components of each figure may be substitutes for other components in other figures to achieve the various methods and embodiments disclosed herein. Methods and protocols disclosed in any embodiment may be run in any order so as to affect their disclosed goals and/or enable performance of the systems as described. Additionally, any one embodiment may utilize any method or protocol described and in any portions, sequences, and combinations thereof.

DETAILED DESCRIPTION

While the disclosures herein contemplate use of exemplary drive belt storage systems to be described in any vehicle and/or recreational vehicle, including recreational vehicles of the type previously indicated and/or known to those skilled in the art, the use of an drive belt storage system of the illustrated snowmobile recreational vehicle of FIG. 1 is for illustration only and not limiting to the intended uses for which such disclosures can be put.

As illustrated in FIG. 1, an exemplary snowmobile 100 may comprise a gas tank 50 on which is disposed a seat 30 for use by a rider of the recreational vehicle. While other configurations of supports for the seat 30 may be used without departing from the spirit of the disclosures herein, it should be understood that the exemplary drive belt storage system herein described is not limited to seats 30 in contact with gas tanks 50, but such seats 30 that are bounded by any other portion of snowmobile 100 that enables the storage features to be herein described.

Figure 1A:
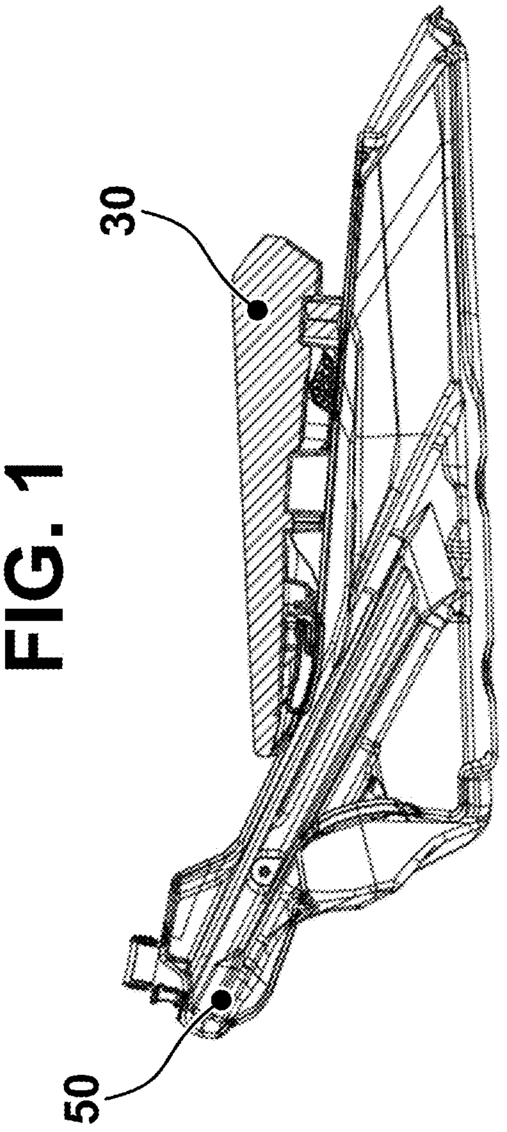
FIG. 1A presents sub-section A of the recreational vehicle of FIG. 1.

Referring to FIG. 1A, an exemplary gas tank 50 may be shown as a base or support for seat 30. A more detailed view of the features illustrated in FIG. 1A may be had with reference to FIG. 6, to be described herein.

Figure 2:
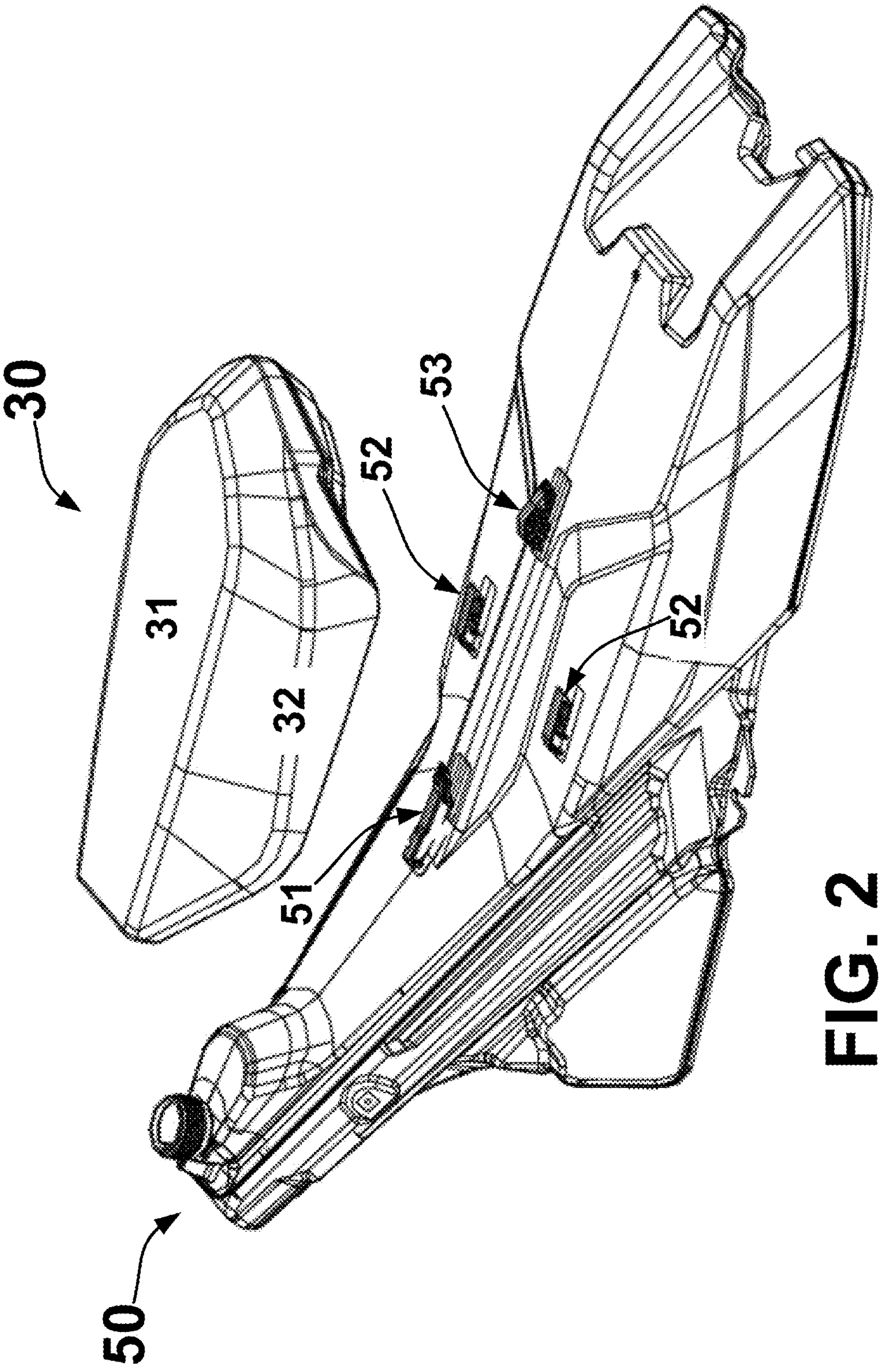
FIG. 2 illustrates an exploded view of the exemplary inventive drive track storage system of FIGS. 1 and 1A.

In an exemplary embodiment in which a gas tank 50 may be used to interconnect an exemplary seat 20 to a recreational vehicle 100, FIG. 2 shows a series of forward, side, and rear latch connections 51, 52, and 53, respectively, via which seat 30 may be secured to gas tank 50, which in turn is secured to recreational vehicle 100 via other interconnections (not shown). According to the illustrative embodiment of FIG. 2, an exemplary seat 30 may have a seating surface 31 and a seat wall 32 that may be designed to numerous types of riders and rider positions. An exemplary seat 30 may be made of a leather, plastic, fabric, and/or a waterproof material that envelops and/or covers foam or other comfort-inducing materials and mechanisms stored therein. Those skilled in the art would understand the variety of methods usable to ensure the interior of the seat 30 that affects comfort to the rider of the recreational vehicle 100 remains within the seat 30 during recreational vehicle use. In the preferred embodiment, a leather or otherwise waterproof material 31/32 covers the foam (not shown) and is stapled around the perimeter of the seat 30 and thereby sandwiches the foam between the cover 30 and the bottom of the seat 30.

Figure 3:
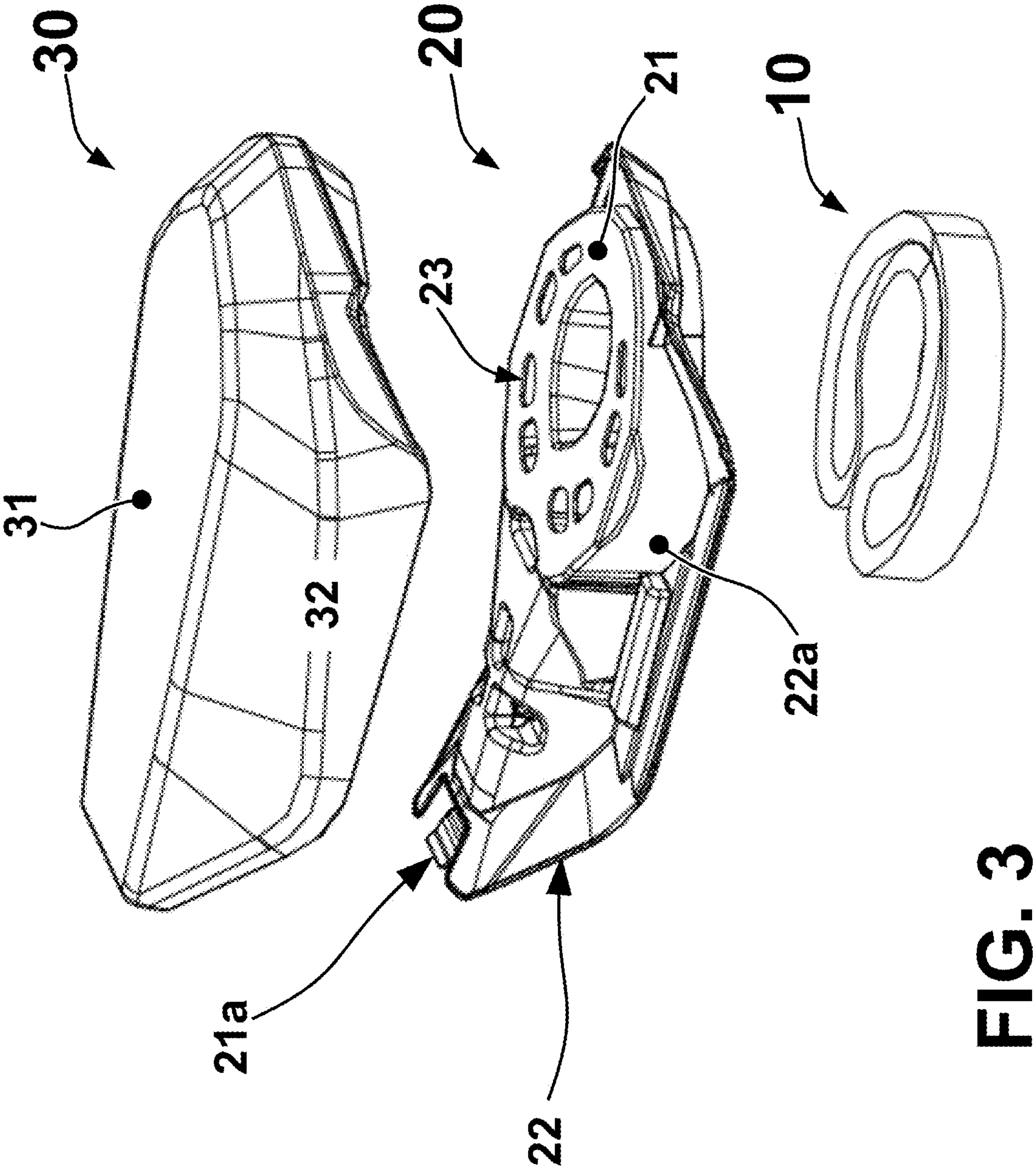
FIG. 3 illustrates a further exploded view of a portion of an exemplary inventive drive track storage system of FIG. 2.

As may be illustrated in FIG. 3, an exemplary seat 30 of the kind described may be illustrated with a sub-base 20 the top portion of which provides a base for seat 30 and a coupling to the recreational vehicle 100, e.g., as illustrated, a coupling to gas tank 50. An exemplary sub-base 20 may be made of metal, plastic, or combinations of the same as the need may be. In an exemplary embodiment, sub-base 20 may be mechanically, chemically, or otherwise adhesively bonded to seat 30. In a preferred embodiment, a leather or otherwise waterproof material 31/32 of seat 30 covers foam (not shown) and may be stapled around the perimeter 22 of a plastic sub-base 20 sandwiching the foam of seat 30 between the cover 31/32 and the upper surface 21 of sub-base 20. An exemplary sub-base 20 may have a plurality of holes 23 through its surface to allow air to escape from the foam, base 20 and seat cover 31/32 when the driver operates the recreational vehicle 100 via the seat 30. In an exemplary embodiment the holes 23 for air passage may be found in the containment section 22*a* for an exemplary drive belt 10, as may be illustrated in further figures.

Figure 4:
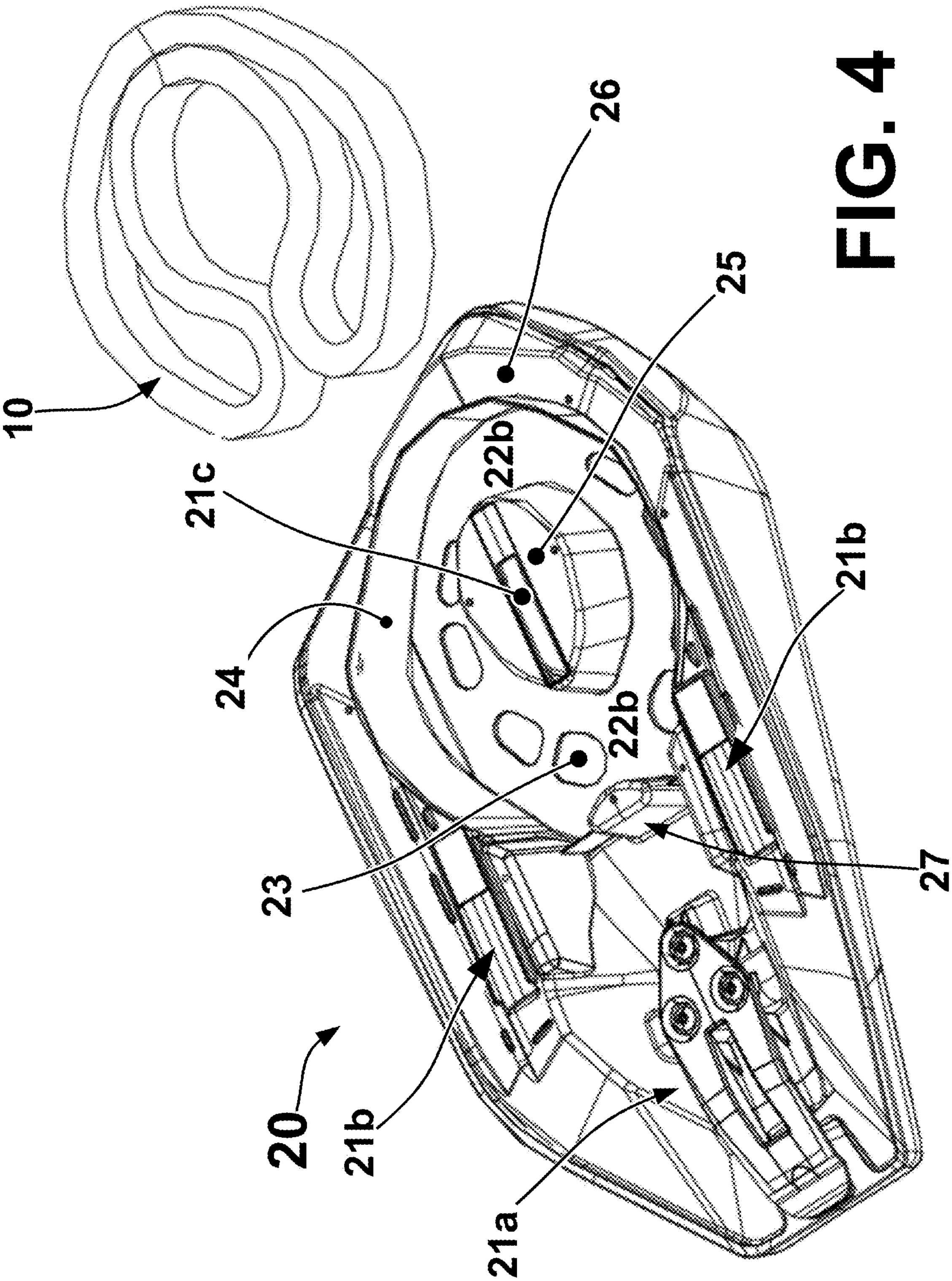
FIG. 4 illustrates an exemplary isometric view of the underside of the exemplary inventive drive track storage system illustrated in FIG. 3.
Figure 5:
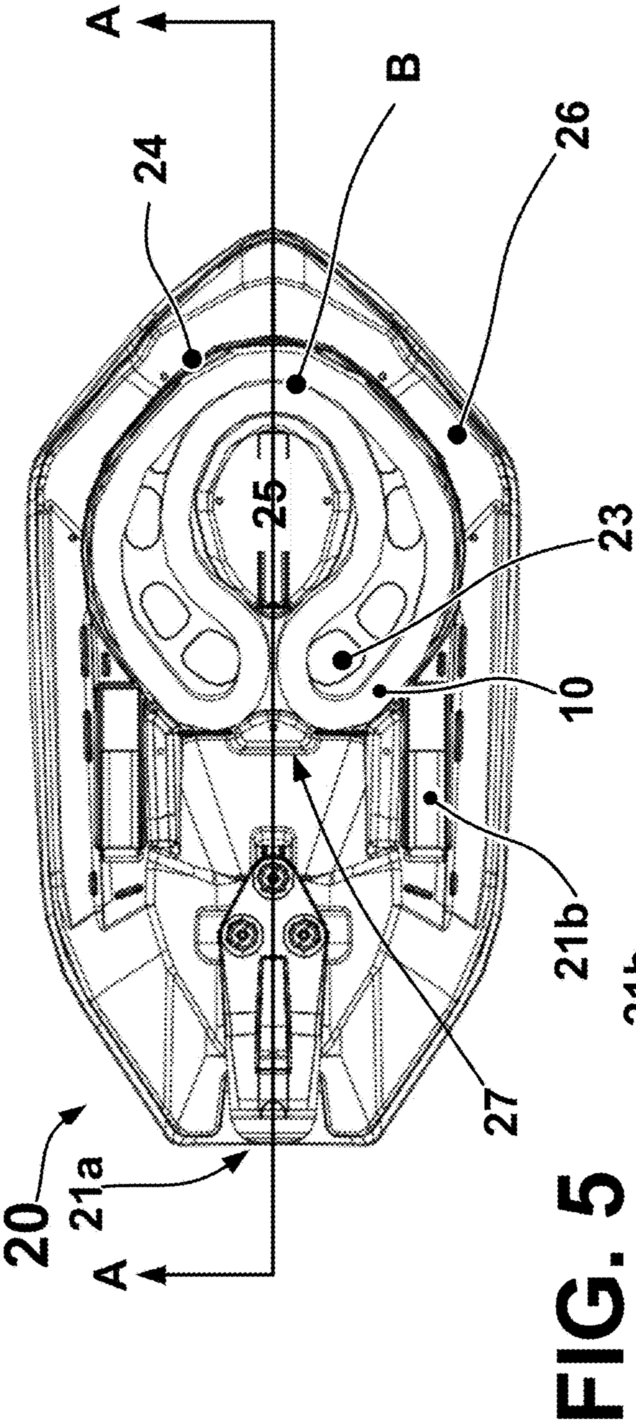
FIG. 5 illustrates another plan view of the underside of the exemplary inventive drive track storage system illustrated in FIGS. 3-4.

As may be illustrated using FIGS. 4 and 5, an exemplary sub-base 20 may also possess release mechanisms 21*a*, 21*b*, and 21*c* to enable the combination of seat 30 and sub-base 20 to disengage from their secured position on the recreational vehicle, such as, for example, latch mechanisms 51, 52, and 53 on gas tank 50. In an exemplary embodiment, a release mechanism 21*a*/*b*/*c* may enable disengagement between seat 30 via sub-base 20 from gas tank 50 latch mechanism 51. In another exemplary embodiment, release mechanism 21*b* on sub-base 20 may be used to disengage the seat 30 from gas tank 50 latch mechanism 52. In an exemplary embodiment, each of the release mechanisms 21*a*/21*b* and latch mechanisms 51, 52, 53 may be any form of snap-fit, friction fit, flexible, magnetic, Velcro®, hook and loop, and/or interlocking engagements and counter-engagements to accomplish combinations of seat 30 to the recreational vehicle 100 via one or more other portions of the vehicle, e.g., the gas tank 50 of an exemplary snowmobile vehicle 100.

With reference to FIG. 4, an exemplary sub-base 20 may be shown from its bottom surface, which may be the surface in most proximal contact with a portion of the recreational vehicle 100 to provide support and substantial enclosure of the contents stored within the same. As may be illustratively provided, sub-base 20 may comprise a rest surface 26 that encloses an indentation or channel **22*b* formed into the containment section 22*a*. An exemplary channel 22*b* may be shaped so that an exemplary drive belt 10 may be placed within the walls of channel 22*b* in a folded conformation. In a preferred embodiment, the depth of the recess 24 of channel 22*b* from rest surface 26 may be such that when the sub-base 20 is placed on a recreational vehicle 100, such as an exemplary snowmobile gas tank 50, the belt 10 and the next most proximal surface of tank 50 thereto are not in contact one another. According to this preferred embodiment, the distancing of belt 10 and the other parts of recreational vehicle 100 may prevent premature wearing of both the belt 10 and/or gas tank 50 (or other part of recreational vehicle 100 to which sub-base 20 may attach). An exemplary sub-base 20 may further comprise a hub 25 which may be disposed adjacent channel 22*b* and/or be centrally located within the same. In an exemplary embodiment, hub 25 may comprise the release mechanism 21*c* for attaching to another portion of recreational vehicle 100, e.g., latch mechanism 53 on an exemplary gas tank 50**.

In another exemplary embodiment referring to FIGS. 4 and 5, an exemplary folded drive belt 10 may be folded, e.g., in a substantially U-shaped configuration, so that the belt 10 has a potential to expand into an un-folded configuration, but when placed within sub-base 20, an exemplary folded belt 10 may be restricted from substantial expansion into such an unfolded conformation due to the shape of the annular channel **22*b*. In an exemplary aspect, the portion of folded drive belt 10 that may contact recess wall 24 of channel 22*b* may frictionally hold itself within the channel 22*b* so as not to fall out of the channel 22*b* when the rest surface 26 is facing the mounting locations of the recreational vehicle 100, e.g., an exemplary gas tank 50 of a snowmobile. In other words, an exemplary channel 22*b* may be configured to induce the folded drive belt 10 to place enough resistance force or friction on the recessed walls 24 of channel 22*b* so as to resist forces of gravity and/or shock forces to cause the folded drive belt 10 to come out of the sub-base 20 and/or contact another part of the recreational vehicle 100, such as, gas tank 50. Thus, the friction induced by the desired uncurling or unravelling of the drive belt 10 against recessed wall 24 may be the sole force to maintain drive belt 10 within sub-base 20. In an alternative embodiment, an exemplary channel 22*b*, wall 24, hub 25, and/or divider 27, may comprise known snaps, hooks, straps, ties, and other holding mechanism to hold the folded drive belt 10 within channel 22*b* during use of the recreational vehicle 100. In a preferred embodiment, an exemplary recessed wall 24 and/or hub 25 may have a flexible clip or fold-out structure to maintain folded drive belt 10 within channel 22*b* and resist its passage by the same to exist sub-base 20 and/or contact another component on recreational vehicle 100. In a preferred embodiment, divider 27 may be used to pass through one undulation of folded drive belt 10 to ensure the same stays within channel 22*b* during operation. An exemplary divider 27 maybe cylindrical, prismatic, or pyramidal, and may also comprise mounting points for portions of release mechanism 21*a* that may allow the portion to double as a retention floor for the folded drive belt. Additionally, while an exemplary divider 27 may be shown as a single construct, it may be contemplated that divider 27 may be two separate and/or spaced-apart surfaces for retaining multiple portions of folded drive belt 10**.

As further illustrated in FIGS. 4-5, an exemplary channel **22*b* may be shown with one or more holes 23 spaced about the channel floor to allow heat from the seat 30 and/or the recreational vehicle 100 to have fluid passage of hot air and/or debris through and around drive belt 10 via sub-base 20. In a preferred embodiment, holes 23 may follow the curvature of exemplary channel 22*b* and allow passage of heat from under seat 30 and above recreational vehicle 100 under sub-base 20. As further illustrated in the illustrative embodiment of FIG. 5, an exemplary sub-base 20 may dispose the folded drive belt 10 in such a configuration that certain portions of its length are in tighter contact with recess wall 24 than others, e.g., point B. As may also be shown, portions of folded drive belt 10 proximal to divider 27 may already show expansion such that they are frictionally held by recess wall 24, but abutment faces of divider 27**.

Figure 6:
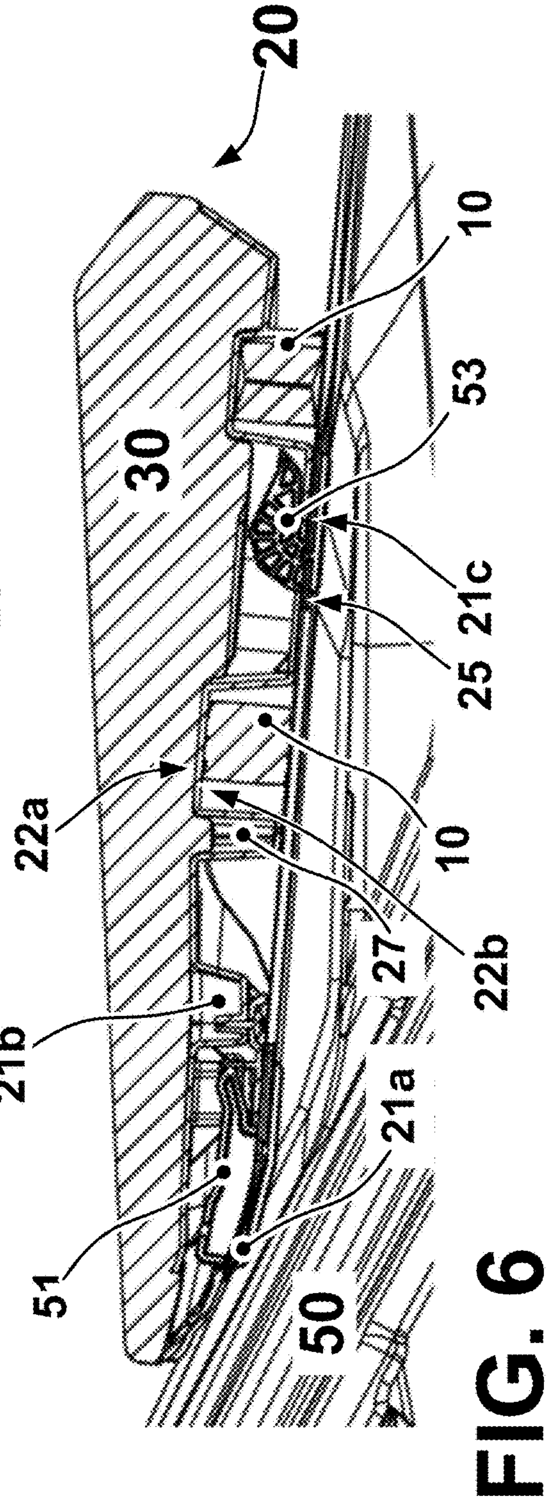
FIG. 6 illustrates a profile sectioned view along line A-A of the exemplary inventive drive track storage system illustrated in FIG. 5.

Referring now to the illustrative embodiment of FIG. 6, an exemplary belt drive storage system may be shown in cross-section such that the thickness of the seat 30 may be shown as well as its very tight mechanical or chemical connection to sub-base 20. Further illustrated in FIG. 6 may be the interaction of the various latch mechanisms 51 and 53 vis-à-vis the receiving mechanism **21*a* and 21*c* of the sub-base 20. The cross section of the rubber folded drive belt 10 may also be shown and out of view behind the portion of hub 25 illustrated in the cross-section of FIG. 6. As may be illustrated, the combination of sub-base 20 and seat 30 may enable a low-profile seat construction that substantially maintains all of the benefits of a uniform seat 30 construction but with the added storage benefits described herein. Furthermore, an exemplary channel 22*b* may be used to store articles other than the folded drive belt 10 disclosed here, and may be shaped in other forms to allow such storage to be affected without detrimental effects to the objects so stored and the portions of the recreational vehicle 100 to which they attach, e.g. the gas tank 50**.

In a preferred embodiment, it is contemplated that an exemplary drive belt storage system could be used on any recreational or other vehicle with a removable seat. Snowmobiles and ATV's are well known to have toolless removable seats. Some side-by-side vehicles also have toolless removable seats but the bottom of the seats are not normally placed directly onto a portion of the vehicle or another component of the vehicle like the fuel tank in snowmobiles. Thus, the disclosures herein can be modified to work with side-by-side vehicles (and others) to allow the sub-bases 20 to comprise hooks and/or other resistance features to keep an exemplary drive belt 10 in its place while the recreational vehicle 100 travels over rough terrain.

Many further variations and modifications may suggest themselves to those skilled in art upon making reference to above disclosure and foregoing interrelated and interchangeable illustrative embodiments, which are given by way of example only, and are not intended to limit the scope and spirit of the interrelated embodiments of the invention described herein.

The invention claimed is:

1. A drive belt storage device, comprising:

a sub-base, wherein the sub-base comprises a containment section facing upwardly, and a channel within the containment section that is recessed from a rest surface of the sub-base by a recessed wall, the rest surface facing downwardly; and a seat interconnected to the sub-base via a perimeter, wherein the channel is configured to hold the drive belt using at least the recessed wall when the drive belt is folded.

2. The drive belt storage device of claim 1, wherein the channel comprises a circular pathway.

3. The drive belt storage device of claim 2, further comprising a hub around which the channel is formed.

4. The drive belt storage device of claim 1, further comprising a hub separating portions of the channel from one another.

5. The drive belt storage device of claim 1, further comprising at least one device coupled to the sub-base opposite an upper surface to further frictionally hold the at least one folded drive belt within the channel.

6. The drive belt storage device of claim 5, further comprising a plurality of holes through the containment section and the channel.

7. The drive belt storage device of claim 1, further comprising a plurality of holes through the containment section and the channel.

8. The drive belt storage device of claim 3, further comprising a plurality of holes through the containment section and the channel.

9. The drive belt storage device of claim 1, wherein the sub-base comprises mechanisms for releasably securing the sub-base to a portion of a recreational vehicle.

10. The drive belt storage device of claim 9, wherein the recreational vehicle is a snowmobile gas tank.

11. The drive belt storage device of claim 1, further comprising a seat foam disposed on top of an upper surface.

12. The drive belt storage device of claim 11, wherein a substantial amount of the seat foam is disposed on top of the sub-base.

13. A drive belt storage device, comprising:

a seat comprising foam and a cover;

a sub-base interconnected to the cover of the seat; and a retention channel comprising at least one recessed wall in the sub-base and a hub around which a folded drive belt is configured to frictionally contact the at least one recessed wall.

14. The drive belt storage device of claim 13, further comprising a plurality of holes in the retention channel.

15. The drive belt storage device of claim 13, further comprising means for securing the folded drive belt disposed on the sub-base.

16. The drive belt storage device of claim 13, further comprising latching mechanisms to interconnect the sub-base and seat to a recreational vehicle.

17. The drive belt storage device of claim 13, further comprising a U-shaped channel and a divider.

18. A recreational vehicle comprising the drive belt storage device of claim 13.

19. A recreational vehicle comprising the drive belt storage device of claim 13 with a drive belt frictionally held therein.

20. The recreational vehicle of claim 18, wherein the recreational vehicle is a snowmobile and the sub-base is disposed on a gas tank of the snowmobile.

* * * * *